Patented Mar. 18, 1952

2,589,378

UNITED STATES PATENT OFFICE 2,589,378

PHENYL-PIPERIDINO-COUMARANS

Hans Henecka, Wuppertal-Elberfeld, Germany, assignor to Schenley Laboratories, Inc., New York, N. Y., a corporation of Delaware No Drawing. Application November 17, 1949, Serial No. 128,016. In Germany October 5, 1948

8 Claims. (Cl. 260—294.7)

This invention relates to a process for the production of phenyl-piperidino-coumarans.

I have found that derivatives of phenyl-piperidino coumaran of the following general constitution:

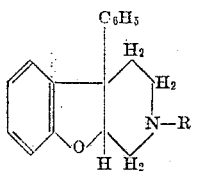

R=H, alkyl, aralkyl, which may further be substituted are distinguished by a high analgesic efficacy resembling that of morphine and by a high analeptic activity.

It is the object of the invention to produce the highly effective 2.3-(2'-N-dimethyl-piperidino-3' .4')-3-phenyl-coumaran of the following constitution:

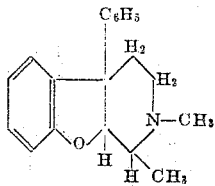

The object is accomplished by first converting the acetonyl ether of β-o-hydroxyphenyl cinnamic acid nitrile (cf. my co-pending application Ser. No. 128,015 of even date herewith, concerning hydroxyphenyl-cinnamic acid nitriles) into the 2-acetyl-3-phenyl-coumaran-3-acetonitrile by the treatment with a small amount of alkali. 2 - acetyl-3-phenyl-coumaran-3-acetonitrile yields 2.3-(2'-methyl-piperidino-3'.4')-3-phenyl-coumaran by hydrogenation which is finally converted according to usual methods into the corresponding N-methyl-piperidino-compound of the above constitution. The following formulae illustrate the new synthesis:

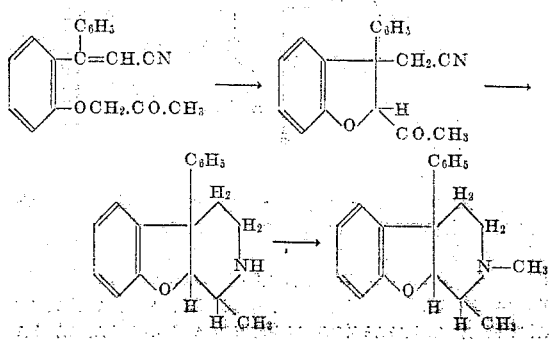

The invention is further illustrated by the following example:

Example 100 grams of β-o-acetonyloxy-phenyl-cinnamic acid nitrile of the melting point 83–84° C. (obtainable by alkylating β-o-hydroxyphenyl-cinnamic acid nitrile with monochloro- or bromo-acetone) are dissolved in 200 ccs. of piperidine. When two ccs. of 20 per cent methyl-alcoholic caustic potash solution are added rearrangement occurs in an exothermic reaction with an increase in temperature up to 60° C. into 2-acetyl-3-phenyl-coumaran-3-acetonitrile. After pouring the piperidine solution into icy-cold dilute sulfuric acid, taking up with ether and distilling the residue on evaporation of the ether, a highly viscous, light-yellow oil of the boiling point 173° C. under 0.15 mm. pressure is obtained. The yield amounts to 80 per cent of the theoretical.

40 grams of this coumaran-derivative dissolved in 250 ccs. of methanol are hydrogenated in the presence of ten grams of Raney-nickel at 100–110° C. and at a $H_2$-pressure of 100 kg./cm.$^2$.

After separating from the catalyst and evaporating the methanol in vacuo an almost colorless sirup is obtained which on high vacuum distillation yields 2.3-(2'-methyl-piperdino-3'.4')-3-phenyl-coumaran as a water-clear, highly viscous oil of the boiling point 143° C. under 0.05 mm. pressure.

By methylating this piperidino compound according to usual methods, for instance, by the reaction with dimethyl sulfate or preferably with formaldehyde/formic acid, 2.3-(2'.N-dimethyl-piperidino-3'.4')-3-phenyl-coumaran is obtained as a readily crystallizing compound. Since the new compound contains three asymmetric C-atoms four stereomeric racemic compounds are to be expected. These four stereomers are not formed in equal quantity. By recrystallizing the crude crystals from ether, acetone or methanol the α-compound of the melting point 157–158° C. is first obtained. It is present in the crude crystallizate in an amount of 50 per cent. From the remaining mother solution an oil is obtained from which the difficulty soluble hydrochloride of the β-compound can be isolated by treatment with n-hydrochloric acid. It has a melting point of 252–254° C. after recrystallization from acetone. The free base obtainable therefrom melts at 105–107° C. The mother solution containing hydrochloric acid yields a mixture of the γ- and δ-compound from which the γ-compound of the melting point 136–138° C. can be isolated after distilling in high vacuo (boiling point 147° C.

under 0.075 mm. pressure) by recrystallizing from gasoline. From the filtrate a residual crystallizate is finally obtained which has no sharp melting point (between 125 and 132° C.) and represents a mixture of the γ-compound and the δ-compound, the latter compound being formed in a very small quantity.

In an analogous manner the following products can be obtained:

(a) 2.3 - (2'-N-dimethyl-piperidino-3'.4') - 3-phenyl-5-methylcoumaran having a melting point of 144-147° C. from β-o-acetonyloxy-p-tolyl-cinnamic nitrile (melting point 73° C.)

(b) 2.3- (2'-N-dimethylpiperidino-3'.4')- 3-p-tolyl-5-methylcoumaran having a melting point of 140° C. from β-o-acetonyloxy-p-tolyl-p'-methylcinnamic nitrile (melting point 109-109° C.)

I claim:

1. In a process for making a chemical compound represented by the formula:

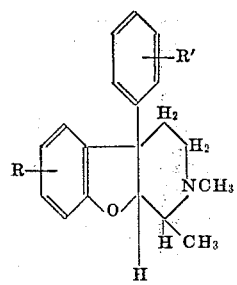

wherein R and R' are substituents of the group consisting of hydrogen and lower alkyl groups, the steps that comprise hydrogenating, with gaseous hydrogen under a pressure of the order of about 100 kilograms per square centimeter, at a temperature within the range of about 100° C. to about 110° C., in the presence of a Raney nickel hydrogenation catalyst, a solution, in an inert organic solvent, of a compound represented by the formula:

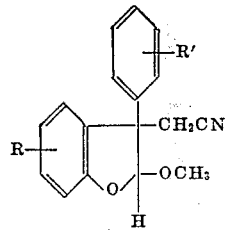

and recovering from the reaction mixture an intermediate product represented by the formula:

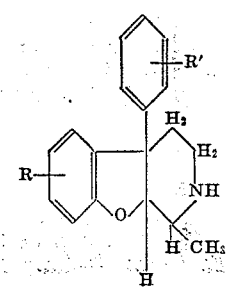

2. In a process for making a chemical compound represented by the formula:

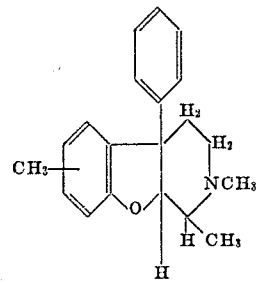

the steps that comprise hydrogenating, with gaseous hydrogen under a pressure of the order of about 100 kilograms per square centimeter, at a temperature within the range of about 100° C. to about 110° C., in the presence of a Raney nickel hydrogenation catalyst, a solution, in an inert organic solvent, of a compound represented by the formula:

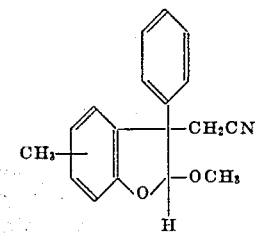

and recovering from the reaction mixture an intermediate product represented by the formula:

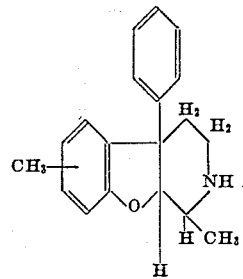

3. In a process for making a chemical compound represented by the formula:

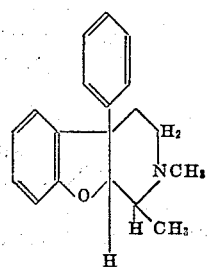

the steps that comprise hydrogenating, with gaseous hydrogen under a pressure of the order of about 100 kilograms per square centimeter, at a temperature within the range of about 100° C. to about 110° C., in the presence of a Raney nickel hydrogenation catalyst, a solution, in an inert organic solvent, of a compound represented by the formula:

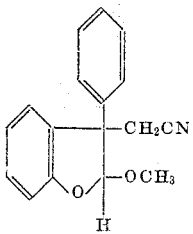

and recovering from the reaction mixture an intermediate product represented by the formula:

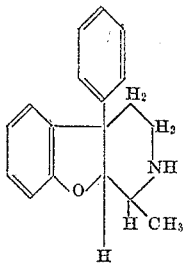

4. The process defined in claim 1 further characterized in that the inert organic solvent is a lower aliphatic alcohol.

5. A chemical compound represented by the formula:

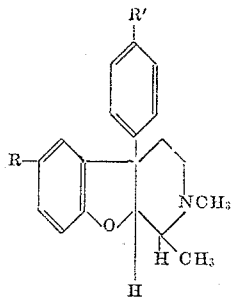

wherein R and R' are substituents chosen from the group consisting of hydrogen and methyl.

6. A chemical compound as defined in claim 5 wherein R and R' are hydrogen.

7. A chemical compound as defined in claim 5 wherein R and R' are methyl.

8. A chemical compound as defined in claim 5 wherein R is methyl and R' is hydrogen.

HANS HENECKA.

REFERENCES CITED

The following references are of record in the file of this patent:

UNITED STATES PATENTS

| Number | Name | Date |
|---|---|---|
| 2,470,108 | Plati et al. | May 17, 1949 |

OTHER REFERENCES

Barltrop, Jour. Chem. Soc. (London), 1946, pp. 958–963.